(12) United States Patent
Hunt (10) Patent No.: US 8,443,056 B2
(45) Date of Patent: May 14, 2013

(54) CLIENT-SERVER SIGNALING IN CONTENT DISTRIBUTION NETWORKS

(75) Inventor: Neil D. Hunt, Los Altos, CA (US)

(73) Assignee: Netflix, Inc., Los Gatos, CA (US)

( * ) Notice: Subject to any disclaimer, the term of this patent is extended or adjusted under 35 U.S.C. 154(b) by 604 days.

(21) Appl. No.: 12/692,372

(22) Filed: Jan. 22, 2010

(65) Prior Publication Data

US 2011/0185041 A1 Jul. 28, 2011

(51) Int. Cl.
*G06F 15/16* (2006.01)
(52) U.S. Cl.
USPC .......................................... 709/219; 709/217
(58) Field of Classification Search .................. 709/219, 709/217
See application file for complete search history.

(56) References Cited

U.S. PATENT DOCUMENTS

| | | | |
|---|---|---|---|
| 7,562,129 B1 | 7/2009 | Lee et al. | |
| 2002/0133830 A1 | 9/2002 | Kim et al. | |
| 2003/0069828 A1 | 4/2003 | Blazey et al. | |
| 2003/0236907 A1* | 12/2003 | Stewart et al. | ................ 709/231 |
| 2004/0103120 A1 | 5/2004 | Fickle et al. | |
| 2006/0235983 A1 | 10/2006 | Layman et al. | |
| 2008/0109306 A1* | 5/2008 | Maigret et al. | .................. 705/14 |
| 2009/0055501 A1 | 2/2009 | Wang et al. | |
| 2009/0080864 A1 | 3/2009 | Rajakarunanayake | |

OTHER PUBLICATIONS

Int'l Search Report, PCT Appl. No. PCT/US 11/22167, mailed Mar. 18, 2011.

* cited by examiner

*Primary Examiner* — Wing F Chan
*Assistant Examiner* — Andrew Woo
(74) *Attorney, Agent, or Firm* — Patterson & Sheridan, LLP (57) ABSTRACT

One embodiment of the present invention sets forth a technique for transmitting and processing download requests specifying download instructions and additional optional intent hints. A client computer signals intent information to an edge server resident within a content delivery network via download requests. The intent information indicates contextual information regarding the download of a digital content file, such as the reason for the download or the amount of the digital content file that might be downloaded in subsequent requests. A suitably equipped edge server adapts the processing of the download request based on the intent information specified by the client computer. In response to the download request, the edge server also transmits a response to the client computer indicating performance characteristics associated with the edge server. The response also indicates alternative servers that can be accessed by the client computer for downloading the digital content file.

22 Claims, 6 Drawing Sheets

CLIENT-SERVER SIGNALING IN CONTENT DISTRIBUTION NETWORKS

BACKGROUND OF THE INVENTION

1. Field of Invention

This disclosure generally relates to network management and more relating to content distribution network that communicate audiovisual media, such as digital files representing movies, television programs, or other audiovisual content.

2. Description of Related Art

Digitally encoded files representing movies, television programs, or other audiovisual content can be communicated from servers storing the content, in a content distribution network (CDN), to clients involved in displaying the content using streaming communication techniques. Streaming delivery often uses progressive file download techniques in which files or portions of files are communicated using hypertext transfer protocol (HTTP). Other techniques include streaming protocols such as RTP, RTSP, RTMP, RTCP. These or any other streaming technologies may be used within the scope of this invention.

Streaming delivery of media files using HTTP for progressive download from CDN servers is subject to many kinds of service degradations and interruptions. For example, implementations that use transport control protocol (TCP) as a transport layer protocol may implement a TCP window ramp-up approach, in which the amount of data transmitted after a packet loss is initially small, and then gradually increases. Although this technique helps ensure reliable data delivery, a consequence is that less data is delivered, temporarily resulting in a poor user experience. Packet loss such as this can be worked around by implementing various techniques. One such technique is opening multiple connections to a single CDN. This approach can be used to minimize throughput degradation which may arise after packet loss. Opening multiple connections is also a possible way to increase share of traffic through a network component that uses round-robin scheduling among many simultaneous connections.

Another technique that can be implemented to workaround service degradation and interruptions is opening connections to multiple CDN servers, to compare performance between competing servers, in order to choose the best. The competing servers may be owned and operated by different CDN providers, or may comprise replicas or related servers within the same CDN.

Yet another technique to workaround service degradation and interruption is opening connections to multiple CDN servers and pulling packets of data through each connection in parallel. In this approach, the best connection will effectively deliver the most data, while compromised connections deliver less data, but do not impede overall throughput. If the congestion factors change, the balance between the parallel connections will shift without the client having to make any adjustment.

Unfortunately, many of these techniques impose unnecessary load upon the CDN servers, which makes them less able to serve other clients. Some of the techniques may result in reducing overall throughput for multiple clients, even though one client implementing the techniques may individually experience better performance.

As the foregoing illustrates, what is needed in the art is a technique for communicating with CDN servers without imposing unnecessary load on the CDN servers and without changing the communication protocols.

SUMMARY OF THE INVENTION

In an embodiment, arguments, decorations, or variations in a universal resource locator (URL), or special parameters in headers of an HTTP request, are configured to signal the intent of a client computer to the CDN. However, the information in the URL or headers does not change the core meaning of the URL, which defines which bits or subset of bits are to be downloaded from a CDN server to the client.

In an embodiment, a CDN server is configured to return one or more status or hint values that may aid the client in making effective choices controlling how the content will be obtained. In one embodiment, a CDN server returns status data by returning an HTTP redirect response, specifying a different URL than the URL requested by the client, and yielding the same content but implying additional instructions or information. In a variation, the URL in the HTTP redirect response includes a general or specific error code, which the client identifies and uses to determine different behavior.

Another embodiment sets forth the symmetrical opposite technique where the server signals optional intent hints to the client computer via embedding in redirect responses, or adding the intent information as additional response headers. A suitably equipped client computer may adapt its behavior to take advantage of the hints to modify or optimize cost or performance.

Both of these techniques are "backward compatible" with either clients or CDN servers that are not compatible with the techniques or not configured to use the techniques. Such incompatible clients or servers can continue to function, albeit less efficiently, without the processing described here. Specifically, the URL argument, variation, or decoration would be ignored by a generic or non-compatible CDN, which would behave with its best guess of intention instead of knowing the intention of the client, and clients could follow the redirection or status code returns of the CDN server assuming the general meaning of the class of error code, but without understanding the specific meaning that would be attached to that specific code.

Therefore, a content owner can deploy the present techniques in one CDN at a first time and in a second CDN at a different, later time, without impairing conventional operation of both CDNs. In another scenario, a content owner could deploy the present techniques with one CDN, and then bring a new CDN online for the content owner's clients without immediately deploying the present techniques. Both CDNs would provide service to the clients and the second CDN could be upgraded to use the techniques herein without affecting basic client service.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Structural Overview

Figure 1:
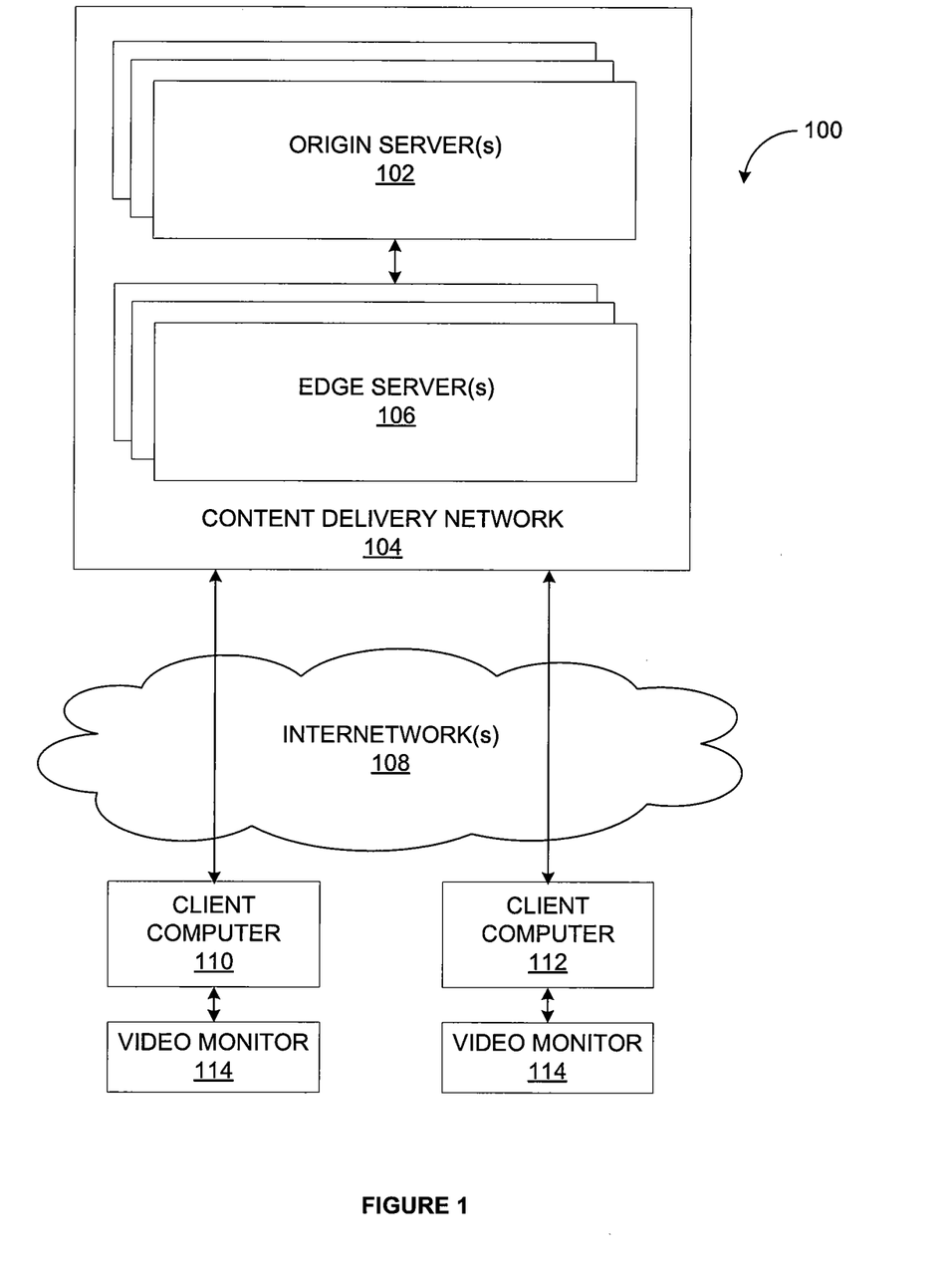
FIG. 1 illustrates a content distribution system configured to implement one or more aspects of the present invention.

FIG. 1 illustrates a content distribution system 100 configured to implement one or more aspects of the present invention. As shown, the content distribution system includes one or more origin servers 102, one or more edge servers 106, internetworks 108, a client computer 110 and a client computer 112.

The origin servers 102 are coupled to the edge servers 106 as part of a content delivery network (CDN) 104. The origin server computer 102 is configured to store a first copy of an audiovisual media file and acts as an authoritative repository or master storage location for media files. The origin server computer 102 stores the audiovisual media file in any technically feasibly fashion on technically feasible media. For example the mass storage unit 316 may comprise a redundant array of independent disks (RAID) system incorporating a conventional file system.

Edge servers 106, of which there may be many in a particular CDN 104, typically is located logically or physically closer to the client computer 110 and the client computer 112 that the edge servers 106 serves. Each of the client computer 110 and the client computer 112, of which there may be thousands, are coupled directly or indirectly through the internetworks 108 to the edge servers 106. The client computers 110, 112 are not restricted to operating with one edge servers 106 as depicted but may connect to any of a large number of edge servers 106 as needed to obtain media files for decoding and display to a user.

Although, in the above description, the CDN 104 includes two levels of server, the origin servers 102 and the edge servers 106, persons skilled in the art will recognize that the architecture of FIG. 1 contemplates only an exemplary embodiment of the invention. Other embodiments may include additional middle-tier levels of servers between the origin servers 102 and the edge servers 106, or a single-tier CDN 104. Thus, FIG. 1 is in no way intended to limit the scope of the present invention in any way.

Each of the client computer 110 and the client computer 112 is coupled to a different video monitor 114 and is configured to decode received media files and deliver an output signal to the respective video monitor 114. In one embodiment, a client computer 110 and the client computer 112 may comprise a set-top box configured to receive streaming audiovisual media from the CDN 104, to convert the media to one or more output signals in a specified audiovisual format, and to provide the one or more output signals to an audiovisual output. In another embodiment, the client computer 110 or the client computer 112 may comprise a digital disc media player, such as a Blu-ray player, configured to receive streaming audiovisual media from a CDN 104, to convert the media to one or more output signals in a specified audiovisual format, and to provide the one or more output signals to an audiovisual output. In another embodiment, the client computer 110 and the client computer 112 may comprise a personal computer, laptop computer, notebook computer, or handheld computer. Embodiments also encompass a computer program product that can be loaded into a computer to perform the functions that are described herein. Thus, an embodiment may comprise a computer-readable storage medium storing one or more sequences of instructions which, when executed by one or more digital processors, cause the processors to perform steps as shown and described.

In operation, the client computer 110 and the client computer 112 transmit download requests to the edge servers 106 within the CDN 104 for downloading audiovisual media files. In response to download requests, the edge servers 106 transmits the audiovisual media files (or units thereof) to requesting client computer. The process of downloading a particular audiovisual media file from the CDN 104 for playback is referred to herein as "streaming."

Figure 2:
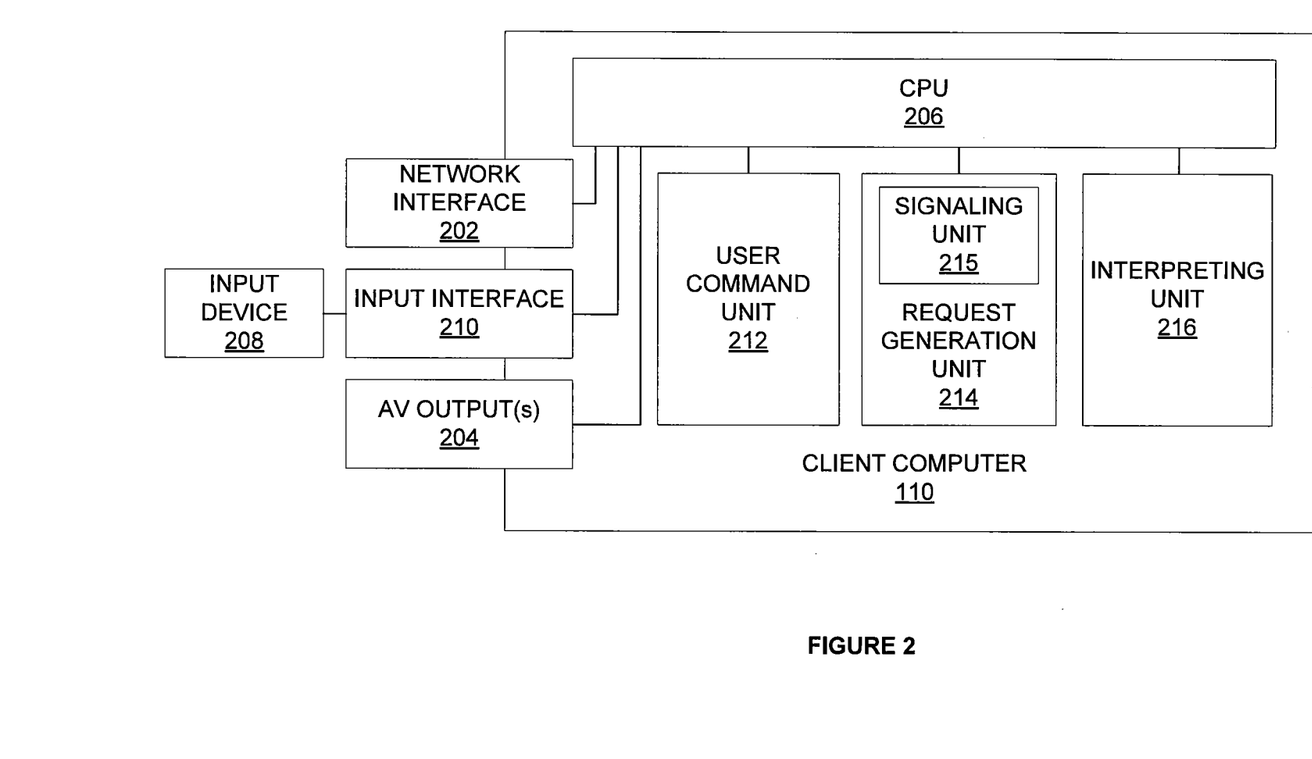
FIG. 2 illustrates a more detailed view of the client computer of FIG. 1, according to one embodiment of the present invention.

FIG. 2 illustrates a more detailed view of the client computer 110 of FIG. 1, according to one embodiment of the present invention. As shown, the client computer 110 includes a network interface 202, audio-video (AV) output(s) 204, a central processing unit (CPU) 206, an input interface 210, a user command unit 212, a request generation unit 214 and a server interpreting unit 216.

The network interface 202, such as a network interface card (NIC), allows the client computer 110 to communicate with the edge server computer 106 via the internetworks 106. The AV output(s) 204 are configured to provide output audio-video signals to the video monitor 114 and a speaker. The input interface 210 is configured to receive signals from a user input device 208, such as a remote control. Each of the network interface 202, the AV output(s) 204 and the user input interface 210 are coupled to the CPU 206, which may comprise a single CPU, multiple CPUs, multi-core CPU devices, or a microcontroller.

The user command unit 212, the request generation unit 214 and the interpreting unit 216 are also coupled to CPU 206. Each of the user command unit 212, the request generation unit 214 and the interpreting unit 216 may be implemented in various embodiments using a computer, one or more application-specific integrated circuits (ASICs) or other digital electronic logic, one or more computer programs, modules, objects, methods, or other software elements. For example, in one embodiment the client computer 110 may comprise a special-purpose computer having particular logic configured to implement the elements and functions described herein. In another embodiment, client computer 110 may comprise a general purpose computer as in FIG. 4, loaded with one or more stored programs which transform the general purpose computer into a particular machine upon loading and execution.

The user command unit 212 is configured to receive user commands from the input device 208 via the input interface 210 and transform the commands into signals transmitted to the request generation unit 214. For example, logic coupled to CPU 206 or instructions in non-volatile memory may be configured to display a user interface on a video monitor 114. The user interface displays a list of movies that are in a queue associated with the user. A user may then manipulate controls on the input device 208 to result in selecting a particular movie. In response, the user command unit 212 signals the request generation unit 214 to compose a download request for transmission to the CDN 104 for downloading an audiovisual media file.

The request generation unit 214 is configured to form and transmit, to the CDN 104, download requests indicating the intent of the client computer 110 and/or instructions with respect to particular media files, as further described herein. In various embodiments, the request generation unit 214 is configured to form a download request in which client intent or client instructions are communicated in a URL parameter or field, or in a field of an HTTP header. The client computer 110 may also include an HTTP client that exposes interfaces that are callable or accessible to the request generation unit 214 for the purpose of dispatching download requests including URLs and HTTP headers that the request generation unit 214 has formed. The request generation unit 214 invokes the HTTP client to transmit the download request to the edge servers 106 for servicing.

As further described herein, the edge servers 106 can return information or instructions in URLs or in the HTTP headers of HTTP responses. In an embodiment, server interpreting unit 216 is configured to parse HTTP responses and identify one or more data values, instructions or parameters within a URL or an HTTP header included in the HTTP response, and to provide the values, instructions or parameters in signals to the CPU 206 or other functional elements. In response, the CPU 206 or other functional elements can modify operation of the client computer 110 based on the values, instructions or parameters.

Persons skilled in the art will recognize that the architecture of the client computer 110 as shown in FIG. 2 contemplates only an exemplary embodiment of the invention. The client computer 110 may include other elements such as memory, program storage in non-volatile memory, other I/O units or devices, a graphics processor or user interface generating unit, and a power supply circuit. Thus, FIG. 2 is in no way intended to limit the scope of the present invention in any way.

Persons skilled in the art will recognize that other electronic devices such as digital televisions, DVD or Blu-ray players, set-top boxes, game consoles, and digital video recorders can also access the CDN 106 for downloading audiovisual media files. The above-mentioned electronic devices may embed the essential computer elements of FIG. 4.

Figure 3:
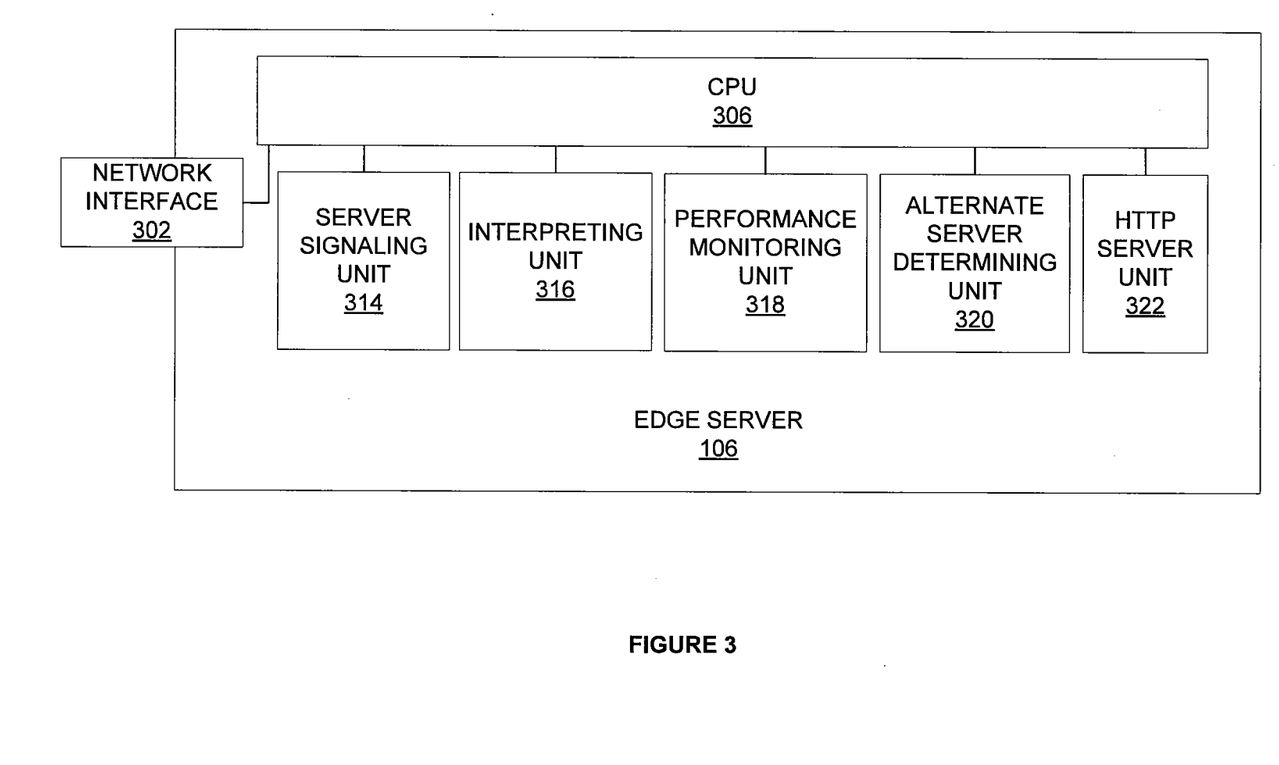
FIG. 3 illustrates a more detailed view of the edge server of FIG. 1, according to one embodiment of the present invention.

FIG. 3 illustrates a more detailed view of an edge server 106 of FIG. 1, according to one embodiment of the present invention. One or more network interfaces 320 are coupled to CPU 306, which is also coupled to a server signaling unit 314, interpreting unit 316, performance monitoring unit 318, alternate server determining unit 320, and HTTP server unit 322. The network interfaces 320 are configured to couple to CDN 104 and to internetwork(s) 108 for communicating content to client computers 110, 112 or to origin server computer 102. The CPU 306 also may be coupled to other I/O interfaces configured to couple to storage systems for content.

In one embodiment, the server signaling unit 314 is configured to form URLs or HTTP headers that convey status data, feedback data, or other information about the CDN 104, origin servers, or edge servers. The interpreting unit 316 is configured to parse and interpret URLs and HTTP headers received in HTTP requests from client computers 110, 112. The performance monitoring unit 318 is configured to determine performance characteristics of the edge server 106 or other servers in the CDN 104. The alternate server determining unit 320 is configured to determine the identity, name, location or other metadata for an alternative content delivery server, for purposes of providing suggestions to client computers 110, 112 about alternative sources of requested content. The HTTP server unit 322 is configured to receive and send HTTP requests and responses in conformance with HTTP.

Each of the server signaling unit 314, interpreting unit 316, performance monitoring unit 318, alternate server determining unit 320, and HTTP server unit 322 may be implemented in various embodiments using a computer, one or more application-specific integrated circuits (ASICs) or other digital electronic logic, one or more computer programs, modules, objects, methods, or other software elements. For example, in one embodiment edge servers 106 may comprise a special-purpose computer having particular logic configured to implement the elements and functions described herein. In another embodiment, edge servers 106 may comprise a general purpose computer as in FIG. 4, loaded with one or more stored programs which transform the general purpose computer into a particular machine upon loading and execution.

Example Client Communications

As previously described herein, the client computer 110 is configured to transmit one or more download requests to an edge server 106. A download request may include a URL or an HTTP header specifying the intent of the client computer 110 or specific instructions for the edge server 106. Examples of download requests transmitted by the client computer 110 specifying the intent of the client computer 110 or specific instructions are set forth below.

In conventional practice as a video stream is initiated, the client computer 110 may transmit a download request to the edge server 106 including a URL specifying the digital content file associated with particular video stream and an amount of the digital content file to be downloaded. In such a scenario the URL included in the download request may be: http://ehub.nefflix.com/123456.asf?start=0&end=10000000, where 123456.asf identifies the digital content file, and the start and end fields specify the amount of the digital content file to be downloaded.

In response to such a download request, the edge server 106 identifies the origin server 102 storing the digital content file, i.e., 123456.asf, and initiates transferring the content file to the edge server 106 for caching at the edge server.

In one embodiment, the client computer 110 transmits a download request that specifies the intent of the client computer 110 for probing network conditions within the CDN 104 to the edge server 106. In such an embodiment, the client computer 110 may not need the entire file and intends to only perform a bandwidth test to determine performance characteristics of the CDN 104. The intent of the client may be to download a small portion of the file to determine the download bandwidth between the client computer 110 and the edge server 106, prior to making similar measurements from edge server 106 within the content distribution system 110. In such an embodiment, the request generation unit 214 client computer 110 forms and transmits a download request specifying the "bandwidth test" intent to the edge server 106. An example of a download request formed by the request generation unit 214 specifying the "bandwidth test" intent to the edge server 106 may include a URL of the form: http://ehub.netflix.com/123456.asf?start=0&end=10000000&intent=speedtest.

The URL includes an additional field denoted "intent" specifying the value "speedtest." In response to receiving such a download request, the edge server 106 may be configured to receive and interpret the URL at interpreting unit 316. Once the "intent" field is interpreted by the interpreting unit 316, the edge server 106 downloads and caches only the requested portion of the specified digital content file from the origin server 102, and waits for additional instructions prior to initiating the caching of the entire digital content file.

In another embodiment, once the client computer 110 has determined that a particular CDN 104 is the best source for the digital content file, the client computer 110 may transmit instructions to the edge server 106 that the entire digital content file should be cached. In such a scenario, the request generation unit 214 forms a download request specifying in a URL or in an HTTP header that the entire digital content file should be cached from the origin server 102. An example of a download request formed by the request generation unit 214 specifying the caching of the entire digital content file instructions may include a URL of the form: http://ehub.neflix.com/123456.asf?start=10000000&end=20000000&intent=cacheall.

In this form, the "intent" field has the value "cacheall," which the interpreting unit 316 of edge server 106 interprets as an instruction to begin downloading the entire digital content file from the origin server 102 and caching the entire digital content file.

In an alternative embodiment, if the client computer 110 determines, based on past user behavior or based on configuration data, that a typical user is likely to browse just the first 10 minutes of a 90 minute video stream associated with a digital content file, then the client computer 110 could transmit, for example, the argument cache=150000000 to instruct the server to cache only the first 10 minutes of a 2 Mbps stream. Thus, the value "cache=150000000" comprises an explicit instruction of the amount of data to cache and deliver.

In another embodiment, client computer 110 may form a URL that signals the edge server 106 to obtain multiple separate digital content files in succession, in a sequence or chain. For example, video content may have been divided into multiple 3-second units each stored in digital content files, for example files named 123456_001.asf, 123456_002.asf etc. In this case, the client computer 110 may initiate the download of the first digital content file, i.e., 123456_001.asf, and simultaneously instruct the edge server 106 to start downloading the next digital content file in order with a URL having the form: http://ehub.netflix.com/123456_001.asf&next=123456_002.asf.

A URL of this form includes a first file identifier and a "next" field that identifies a second file, thereby instructing the edge server 106 to begin caching the next file that will be requested by the client. This approach may enable the client computer to efficiently request and obtain multiple files of a sequence without requiring the edge server to cache an entire movie, for example.

In another embodiment, the client computer may form a URL that proposes a pricing bid to the CDN 104, that the CDN 104 may use to determine whether the CDN 104 can serve the request or not. For example, the client might form the URL http://ehub.nefflix.com/123456.asf&bid=rate2. This indicates that the client is prepared to pay a rate specified by schedule "rate2", which might indicate a premium for delivery from a particular CDN (for example, a CDN that is known to be well connected or have superior performance), or a lower rate for a CDN in a region that is well served by competing CDNs. Without loss of generality, "Rate2" could refer to a predetermined rate schedule by name, or it could be a URL for a file containing a rate schedule, perhaps formatted in XML, or it could be replaced by the specific numeric pricing proposed—for example a peak bit-rate or MB delivered rate, or it could include a proposal for different performance levels for different prices.

Example Server Communications

In one embodiment, the edge server 106 is configured to provide one or more of the following signals expressing server feedback or instructions to the client computer 110 and the client computer 112.

An edge server 106 nearing an overload condition may prefer that a smart client, having the capability to discover alternative sources for the requested content, should determine and switch to an alternate content server. However, the edge server 106 may not want to reject the request altogether in case all other CDNs 104 are just as busy or are unreachable. In an embodiment, edge server 106 is configured to signal to the client computer 110 by issuing an HTTP redirect (in response to a download request) with a field that informs the client computer about the percentage of processing capacity of the edge server 106 that is in currently in use.

In conventional HTTP processing, a redirect response comprises an HTTP response having a 300-series status code, and a compatible client is required to examine the HTTP header values to identify a URL parameter to which the server is redirecting the client. In an embodiment, as an example, if the edge server 106 receives an HTTP request that contains a URL argument having the following form: http://ehub.neflix.com/123456.asf?start=0&end=10000000&intent=cache. In response, the edge server 106 transmits an HTTP redirect that includes a URL argument having the following form: http://ehub.nefflix.com/load=90/123456.asf?start=0&end=100000000&intent=cache.

In this example, the field "load=90" informs the client computer 110 that the edge server 106 is operating at 90% load. Without loss of generality, "load" could indicate computational resources, memory or disc cache resources, network resources, or any other resource that may be limited. In response, based on local state data or stored policy or logic, such as threshold crossing logic, client computer 110 determines whether to switch over to another edge computer 106 or another CDN 104.

In another embodiment, the edge server 106 is configured to signal to a client computer 110 that the edge server 106 is about to go offline. Such a signal is important so that the client computer 110 is able switch to an alternate CDN 104 without disrupting the video stream associated with the digital content file being downloaded. In such an embodiment, the edge server 106 that is about to go offline issues, in response to a download request from the client computer 110, an HTTP redirect response having the form: http://ehub.netflix.com/offlineat=103257698/123456.asf. The field "offlineat" specifies a particular time at which the edge server 106 is scheduled to go offline.

In an embodiment, the edge server 106 is configured to signal a client computer 110 with information indicating a suggested alternative server, which the client computer 110 may use to obtain the same digital content file if the current edge server 106 goes offline, or if unacceptable network performance characteristics are experienced. In such an embodiment, to signal an alternative server, the edge server 106 responds to a download request from the client computer 110 with an HTTP redirect response having the form: http://ehub.nefflix.com/standby=ehub2.netflix.com/123456.asf. The field "standby" specifies a different edger server 106 from which the digital content file may be downloaded by the client computer 110.

In another embodiment, the edge server is configured to signal a client computer with information indicating variable pricing for delivering particular traffic. In this case, the redirect response might have the form: http://ehub.netflix.com/pricing=rate2/123456.asf. The field "pricing" informs the client that the cost schedule for downloads will be per schedule called "rate2." The client could compare cost profiles of several different CDN providers, and choose the best balance of cost and performance for delivery. The client would abandon a connection for a CDN issuing such a redirect request if it determined that the pricing was not sufficiently favorable, or the client could choose to abandon connections to competing CDNs if this CDN pricing is sufficiently favorable. Without loss of generality, "Rate2" could refer to a predetermined rate schedule by name, or it could be a URL for a file containing a rate schedule, perhaps formatted in XML, or it could be replaced by the specific numeric pricing proposed—for example a peak bit-rate or MB delivered rate, or it could include a proposal for different performance levels for different prices.

Variations and Extensions

Embodiments have been described that provide an out-of-band, backward-compatible signaling mechanism by which CDN 104 clients signal content transfer intent to CDN 104 servers, and CDN 104 servers signal performance conditions and other content delivery information to CDN 104 clients. The preceding embodiments represent examples and many alternatives and variations are contemplated within the broad inventive concepts that have been disclosed.

In one embodiment, in place of URL arguments, such as URL segments in the form "?start=0", the arguments could be placed in the HTTP request header, without loss of generality in the approaches herein. In another embodiment, in place of URL arguments ("?start=0"), the arguments could be added elsewhere in the URL, such as within a path portion of a URL in the form http://ehub.netflix.com/start=0/123456.asf, without loss of generality.

In yet another embodiment, in place of an HTTP redirect to a different URL, the edge server 106 may send signals to client computer 110 using HTTP status codes. As defined in HTTP protocol standards, codes beginning with 400 or 500 generally represent various kinds of error conditions, while codes beginning with 200 generally represent success conditions. The edge server 106 may define new codes that would be interpreted by generic (non-compatible) clients as general errors (such as just "server error" or "content not found," and interpreted by the client computer 110 as specific messages. For example, a new HTTP code 290 could indicate "load=90%." In yet another embodiment, in place of an HTTP redirect to a different URL, the edge server 106 may signal to the client computer 110 using values placed in HTTP response headers, without loss of generality.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
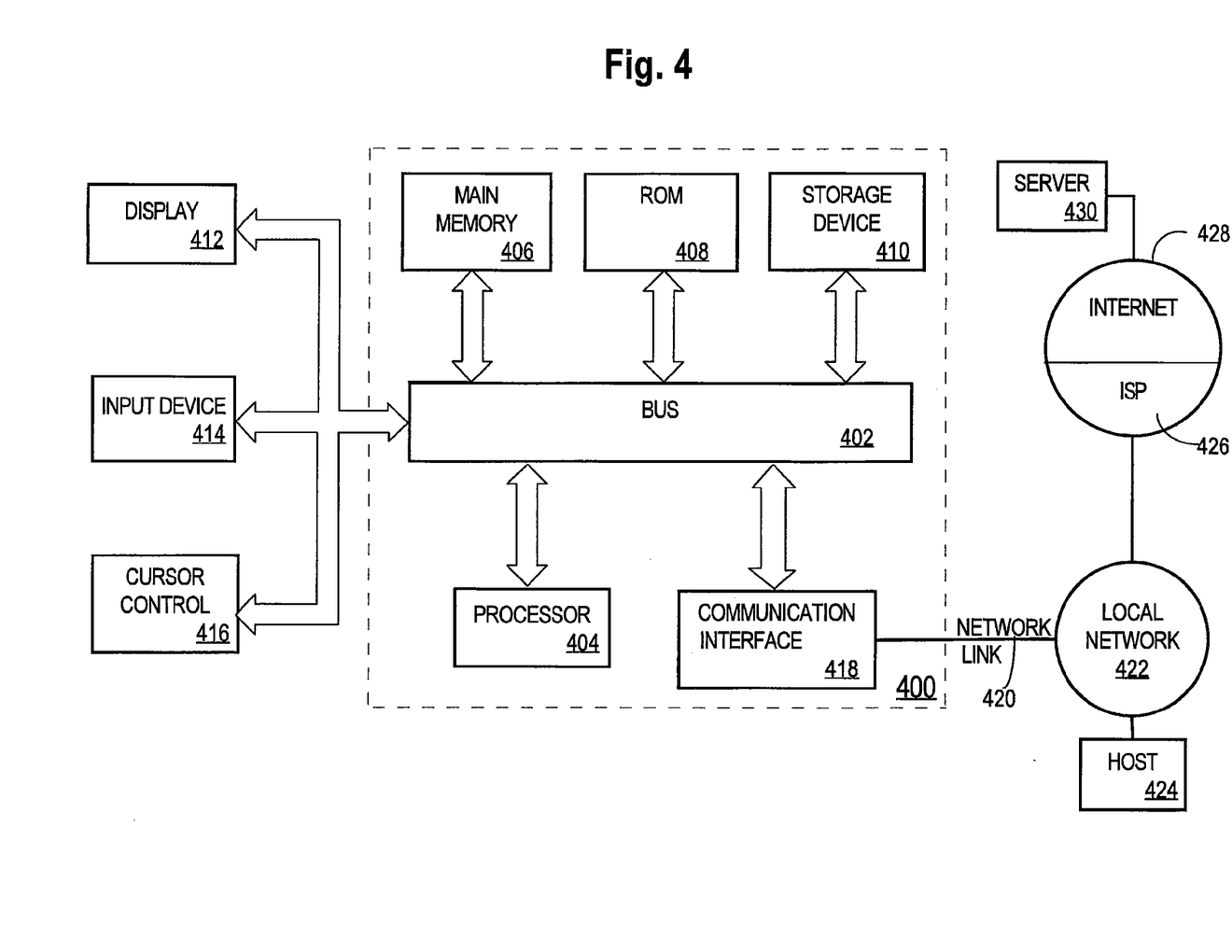
FIG. 4 is a block diagram that illustrates a computer system 400 upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "computer-readable storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 5A:
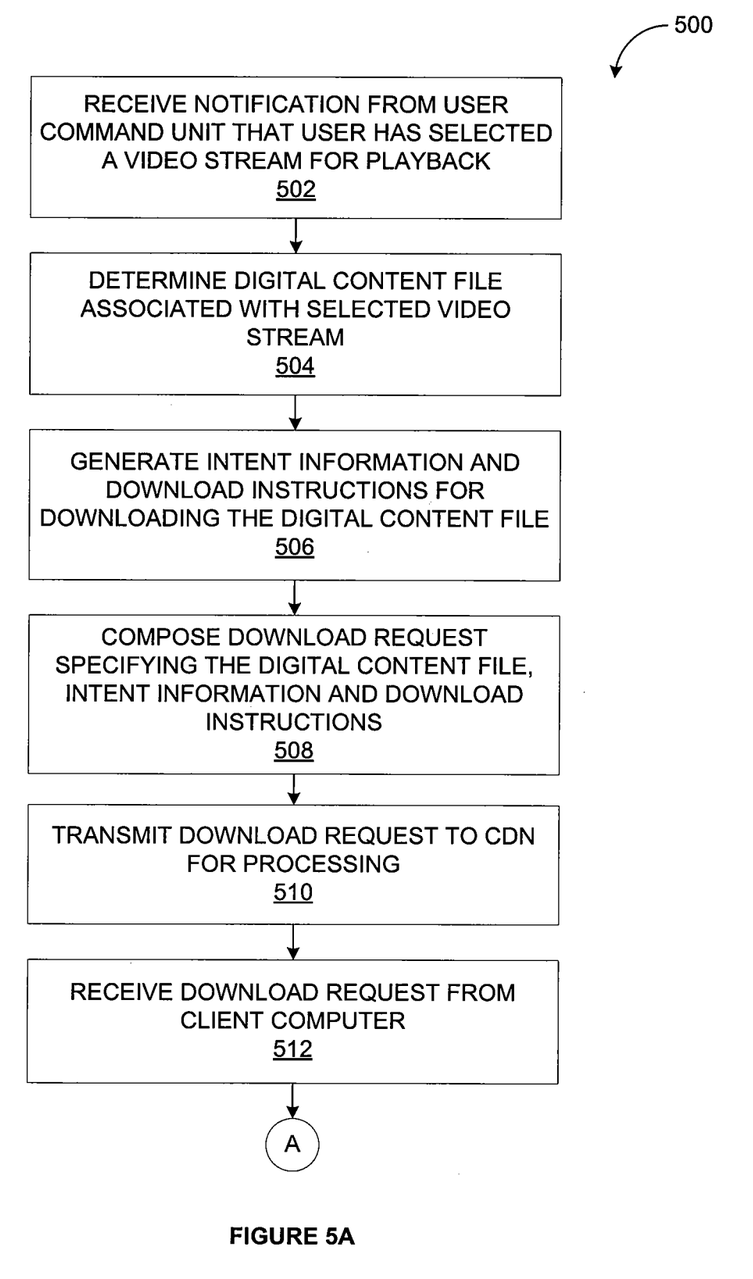
FIGS. 5A and 5B set forth a flow diagram of method steps for transmitting and processing download requests specifying intent and download instructions, according to one embodiment of the present invention.
Figure 5B:
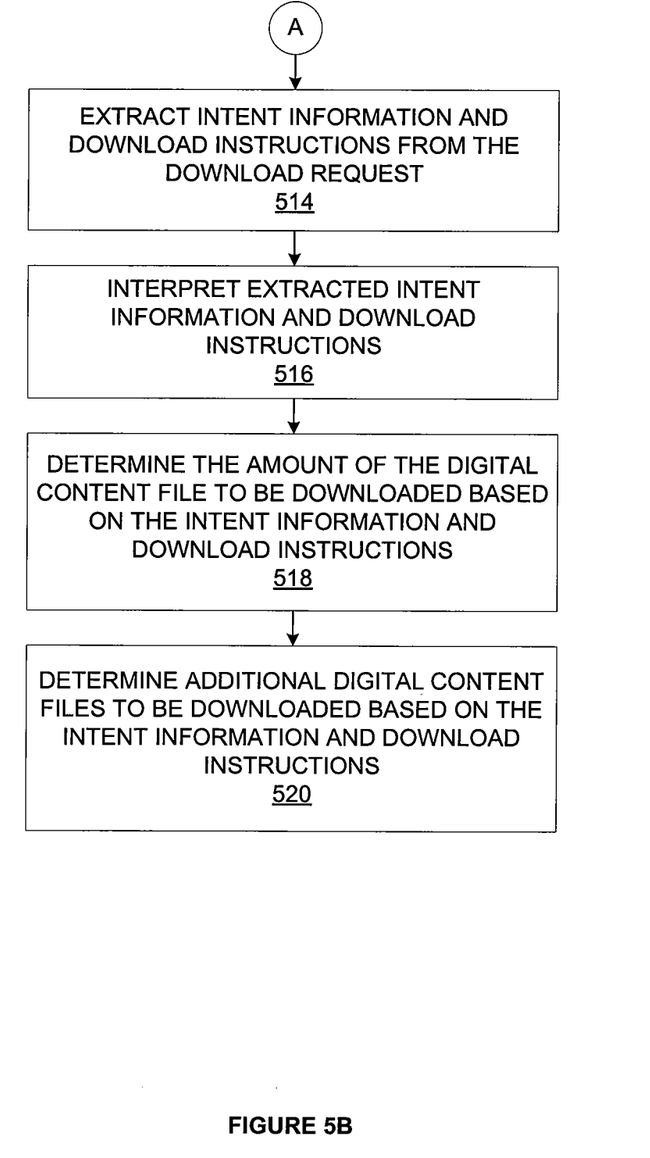

FIG. 5 is a flow diagram of method steps for transmitting and processing download requests specifying intent and download instructions, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the request generation unit 214 within the client computer 110 receives a notification from the user command unit 212 that the user has selected a particular video stream for playback. At step 504, in response to the notification, the request generation unit 214 first determines that the digital content file stored within the origin server 102 is associated with the particular video stream selected for playback.

At step 506, the request generation unit 214 generates intent information and download instructions for downloading the digital content file associated with the particular video stream from the origin server 102 via the edge server 106. The intent information indicates the reason why the digital content file is being downloaded and what may be desired subsequently. As previously described herein, the intent information and the download instructions may include probing the edge server 106 for bandwidth tests or specifying how much of the digital content file should be cached by the edge server 106. As also previously described herein, the intent information and the download instructions may specify additional digital content files associated with the digital content file that should also be downloaded and cached by the edge server 106.

At step 508, the request generation unit 214 composes a download request that specifies the digital content file to be downloaded and also includes the intent information and download instructions generated at step 506. As previously described herein, the download request may include a URL that includes fields for specifying the intent information and the download instructions. The download request may also include HTTP headers in which the intent information and the download instructions may be specified. Once the download request is composed, the request generation unit 214, at step 510, transmits the download request via the network interface 202 and the internetworks 108 to CDN 104, which delivers it to an appropriate edge server 106.

At step 512, the edge server 106 receive the download request from the client computer 110. At step 514, the download request is processed by the interpreting unit 316 within the edge server 106 to extract the intent information and the download instructions for the download request. At step 516, the interpreting unit 316 interprets the intent information and the download instructions. As previously described herein, the intent information specified by the fields within a URL included in the download request is interpreted by the edge server 106 to determine the intent of the client computer 110. This allows the edge server 106 to process download requests received from the client computer 110 adaptively based on the intent signaled by the client computer 110.

At step 518, the interpreting unit 316 determines the amount of the digital content file to be downloaded based on the intent information and the download instructions interpreted at step 512. For example, if the intent of the client computer 110, as specified by the download request, is to probe the bandwidth availability between the client computer 110 and the edge server 106, then the edge server 106 only downloads and caches the amount of the digital content file specified by the download request.

At step 520, the interpreting unit 316 determines additional digital content files, if any, to be downloaded, as specified by the download instructions interpreted at step 512. For example, if the digital content file is part of a sequence of digital content files, the download instructions may specify additional digital content files within the sequence that should be downloaded and cached by the edge server 106.

In addition, the server signaling unit 314 transmits a notification (in the form of an HTTP response), in response to the download request, to the client computer 110 based on performance characteristics associated with the edge server 106. As previously described herein, the HTTP response may be in the form of an HTTP redirect. The server signaling unit 314 communicates with the performance monitoring unit 318 to determine whether the edge server 106 is overloaded or whether the edge server 106 may be scheduled to go offline. In such a case, the server signaling unit 314 transmits a notification to the client computer 110 specifying that the quality of service provided by the edge sever 106 may be impacted at some point in the future. The server signaling unit 314 may also communicate with the alternate server determining unit 320 in such a case to include, in the notification, alternate servers from which the client computer 110 may alternatively download the digital content.

One advantage of the disclosed technique is that the edge server downloads and caches only the necessary portions (the portions that are retrieved by the client computer) of the digital content file specified by a download request based on the intent information included in the download request. Because the edge server does not need to download and cache portions of the digital content file that are not be retrieved by the client computer, the computational load on the edge server is significantly reduced. In addition, because the edge server indicates performance characteristics and alternate edge servers to the client computer when the quality of service can be impacted, the client computer can preemptively switch to an alternate edge server without disrupting the playback of the digital content file.

Another advantage of the disclosed technique is that the communication protocol between a client computer and a CDN remains unchanged, and therefore, the technique is both backward and forward compatible. If either a client computer or the CDN is not configured to interpret the additional signaling information included in the client requests and/or server responses, the delivery of data from the CDN to the client computer continues in a conventional manner.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A computer-implemented method for processing augmented download or streaming requests received from a client computer, the method comprising:

receiving a valid download or streaming request generated by the client computer to include protocol information specifying at least one portion of a digital content file that should be transmitted to the client computer and information additional to the protocol information that conveys an additional purpose of the download or streaming request, wherein the additional information comprises at least one of: (i) a status of a storage server, and (ii) a method of fulfilling the request, wherein the additional purpose relates to optimizing fulfillment of the request, wherein the additional information is programmatically generated by the client computer without receiving user input requesting the additional purpose;

in response to the download or streaming request, retrieving the portion of the digital content file from the storage server;

upon determining that fulfilling the additional purpose optimizes system performance, processing the information additional to the protocol information to perform, one or more other actions to modify system behavior to fulfill the additional purpose associated with the download or streaming request;

upon determining that fulfilling the additional purpose does not optimize system performance, ignoring the information additional to the protocol information and not modifying system behavior; and transmitting the portion of the digital content file to the client computer.

2. The method of claim 1, wherein at least one of: (i) a server, and (ii) a client processes the information additional to the protocol information and modifies system behavior to optimize system performance.

3. The method of claim 1, wherein the additional information indicates that the likelihood of the client computer transmitting another download or streaming request for additional portions of the digital content file is low and the one or more actions include determining that the additional portions of the digital content file should not be cached.

4. The method of claim 1, wherein the additional information indicates that the likelihood of the client computer transmitting another download or streaming request for additional portions of the digital content file is high and the one or more actions include determining that additional portions of the digital content file should be cached.

5. The method of claim 1, wherein the additional information indicates a specific amount of the digital content file that should be cached and the one or more actions include retrieving the specific amount of digital content file from the storage server and caching the specific amount of the digital content file.

6. The method of claim 1, wherein the additional information indicates a pricing bid and wherein the one or more actions include determining whether to accept the pricing bid.

7. The method of claim 1, wherein the download or streaming request is a uniform resource locator (URL) and the protocol information is included in a first field of the URL and the additional information is included in a second field of the URL.

8. The method of claim 1, wherein the download or streaming request includes a first request header storing the protocol information and a second request header storing the additional information.

9. A non-transitory computer-readable storage medium storing instructions that, when executed by a server, cause the server to process augmented download or streaming requests received from a client computer, by performing the steps of:

receiving a valid download or streaming request generated by the client computer to include protocol information specifying at least one portion of a digital content file that should be transmitted to the client computer and information additional to the protocol information that conveys an additional purpose-of the download or streaming request, wherein the additional information comprises at least one of: (i) a status of a storage server, and (ii) a method of fulfilling the request, wherein the additional purpose relates to optimizing fulfillment of the request, wherein the additional information is programmatically generated by the client computer without receiving user input requesting the additional purpose;

in response to the download or streaming request, retrieving the portion of the digital content file from the storage server;

upon determining that fulfilling the additional purpose optimizes system performance, processing the information additional to the protocol information to perform, one or more other actions to modify system behavior to fulfill the additional purpose associated with the download or streaming request;

upon determining that fulfilling the additional purpose does not optimize system performance, ignoring the information additional to the protocol information and not modifying system behavior; and transmitting the portion of the digital content file to the client computer.

10. The non-transitory computer-readable storage medium of claim 9, wherein at least one of: (i) a server, and (ii) a client processes the information additional to the protocol information and modifies system behavior to optimize system performance.

11. The non-transitory computer-readable storage medium of claim 9, wherein the additional information indicates that the likelihood of the client computer transmitting another download or streaming request for additional portions of the digital content file is low and the one or more actions include determining that the additional portions of the digital content file should not be cached.

12. The non-transitory computer-readable storage medium of claim 9, wherein the additional information indicates that the likelihood of the client computer transmitting another download or streaming request for additional portions of the digital content file is high and the one or more actions include determining that additional portions of the digital content file should be cached.

13. The non-transitory computer-readable storage medium of claim 9, wherein the additional information indicates a specific amount of the digital content file that should be cached and the one or more actions include retrieving the specific amount of digital content file from the storage server and caching the specific amount of the digital content file.

14. The non-transitory computer-readable storage medium of claim 9, wherein the additional information indicates a pricing bid and wherein the one or more actions include determining whether to accept the pricing bid.

15. The non-transitory computer-readable storage medium of claim 9, wherein the download or streaming request is a uniform resource locator (URL) and the protocol information is included in a first field of the URL and the additional information is included in a second field of the URL.

16. The non-transitory computer-readable storage medium of claim 9, wherein the download or streaming request includes a first request header storing the protocol information and a second request header storing the additional information.

17. A system, comprising:

one or more computer processors; and a memory containing a program which when executed by the one or more computer processors performs an operation to process augmented download or streaming requests received from a client computer, the operation comprising:

receiving a valid download or streaming request generated by the client computer to include protocol information specifying at least one portion of a digital content file that should be transmitted to the client computer and information additional to the protocol information that conveys an additional purpose-of the download or streaming request, wherein the additional information comprises at least one of: (i) a status of a storage server, and (ii) a method of fulfilling the request, wherein the additional purpose relates to optimizing fulfillment of the request, wherein the additional information is programmatically generated by the client computer without receiving user input requesting the additional purpose;

in response to the download or streaming request, retrieving the portion of the digital content file from the storage server;

upon determining that fulfilling the additional purpose optimizes system performance, processing the information additional to the protocol information to perform one or more other actions to modify system behavior to fulfill the additional purpose associated with the download or streaming request;

upon determining that fulfilling the additional purpose does not optimize system performance, ignoring the information additional to the protocol information and not modifying system behavior; and transmitting the portion of the digital content file to the client computer.

18. The system of claim 17, wherein at least one of: (i) a server, and (ii) a client processes the information additional to the protocol information and modifies system behavior to optimize system performance.

19. The system of claim 18, wherein the additional information includes a computational load associated with a distribution server.

20. The system of claim 18, wherein the additional information includes a time stamp indicating when a distribution server is scheduled to go offline.

21. The system of claim 18, wherein the additional information includes an alternate distribution server from which the digital content file can be downloaded or streamed.

22. The system of claim 17, wherein the additional information includes include a pricing rate at which a distribution server offers to deliver the digital content.

* * * * *